United States Patent [19]

Esho et al.

[11] Patent Number: 4,504,548

[45] Date of Patent: Mar. 12, 1985

[54] OPTICAL INFORMATION RECORDING MEDIUM FOR SEMICONDUCTOR LASER

[75] Inventors: Sotaro Esho; Masaki Itoh, both of Tokyo; Masaru Matsuoka, Nara, all of Japan

[73] Assignee: NEC Corporation, Tokyo, Japan

[21] Appl. No.: 507,312

[22] Filed: Jun. 23, 1983

[30] Foreign Application Priority Data

| Jun. 25, 1982 [JP] | Japan | 57-109332 |
| Sep. 10, 1982 [JP] | Japan | 57-157475 |
| Apr. 28, 1983 [JP] | Japan | 58-74998 |
| Apr. 28, 1983 [JP] | Japan | 58-74999 |
| Apr. 28, 1983 [JP] | Japan | 58-75000 |
| Apr. 28, 1983 [JP] | Japan | 58-75001 |
| Apr. 28, 1983 [JP] | Japan | 58-75002 |
| Apr. 28, 1983 [JP] | Japan | 58-75006 |

[51] Int. Cl.$^3$ ............ B32B 17/06; B32B 15/04; G01D 15/10

[52] U.S. Cl. ............ 428/426; 260/396 R; 346/76 L; 346/135.1; 369/94; 428/457; 428/532; 428/913; 430/945

[58] Field of Search ............ 428/913, 432, 461; 346/76 L, 135.1; 430/945; 260/245.86, 396 R; 369/94

[56] References Cited

U.S. PATENT DOCUMENTS

| 4,023,185 | 5/1977 | Bloom et al. | 428/913 X |
| 4,298,975 | 11/1981 | van der Veen et al. | 260/245.86 X |
| 4,442,127 | 4/1984 | Jones et al. | 260/396 R |

Primary Examiner—Thomas J. Herbert
Attorney, Agent, or Firm—Sughrue, Mion, Zinn, Macpeak & Seas

[57] ABSTRACT

An optical recording medium is disclosed which allows information to be recorded thereinto and read thereoutof by means of semiconductor laser light. The recording medium comprises at least a substrate and a recording layer formed on one or both sides of the substrate. Information is recorded into and read from the recording layer by laser light. The recording layer comprises an organic film of a naphthoquinonoid dye corresponding to the following molecular formula or an organic film whose major component is the naphthoquinonoid dye:

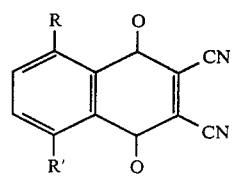

where R is a first auxochrome and R' a second auxochrome. The first auxochrome is a hydroxyl group, an amino group, or an alkyl substituted amino group, while the second auxochrome is a hydroxyl group, an amino group, an alkyl substituted amino group or

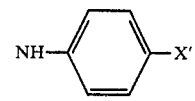

where X' is a hydrogen atom, an alkyl group, an amino group, a substituted amino group or an alkoxyl group.

13 Claims, 10 Drawing Figures

OPTICAL INFORMATION RECORDING MEDIUM FOR SEMICONDUCTOR LASER

BACKGROUND OF THE INVENTION

The present invention relates to an optical recording medium which permits information to be written thereinto and read thereoutof by means of laser light and, more particularly, to a medium comprising a substrate having a dye-containing recording layer on at least one side.

Various kinds of optical recording media have been developed heretofore. There is one particular type of media which permits instant laser recording without processing and, for this reason, it is sometimes referred to as direct-read-after-write (DRAW) media. DRAW media are disclosed in a large number of patents issued up to now. Recording materials used in DRAW media are available in a wide range, from inorganic to organic substances. Among them, organic dyes have been considered due to their potential advantages over inorganic substances, such as Te-alloys in regard to recording sensitivity, chemical stability and fabrication latitude.

Media using organic dyes are accessible in various forms and may generally be classified into two types, i.e., dye film type and dye-in-polymer type. Dye film type media can be produced on a substrate by means of vapor deposition of a dye. U.S. Pat. No. 4,023,185, issued May 10, 1977, to Bloom, Bartolini and Bell of RCA Corporation describes the use of 4-phenylazo-1-naphthylamine to form a dye film as a recording layer. The medium having the dye film is inapplicable to semiconductor layer recording, because it does not show a sufficient absorption in the semiconductor laser wavelengths (~800 nm). U.S. Pat. No. 4,298,975, issued Nov. 3, 1981, to van der Veen, Kivits and de Bont of U.S. Philips Corporation discloses the use of phthalocyanine compounds as a dye. Phthalocyanine compounds, especially vanadyl phthalocyanine, are even worse than Te-alloys with respect to recording sensitivity for semiconductor lasers, although exhibiting a relatively large absorption in the near infrared range. Meanwhile, dye-in-polymer type media can be prepared by means of coating of a solution containing dye dissolved in an organic polymer with a solvent. A dye-in-polymer type medium may be formed by the use of polyester yellow as a dye and polyvinyl acetate as an organic polymer, as described in Japanese Patent Laid-Open Publication No. 161690/1980, for example. The medium, however, cannot serve as a medium for recording apparatus of the type which uses semiconductor lasers, because polyester yellow shows weak absorption in the semiconductor laser wavelength range.

SUMMARY OF THE INVENTION

It is therefore an object of the present invention to provide an optical information recording medium which is highly sensitive for semiconductor laser recording and chemically stable.

It is another object of the present invention to provide a generally improved optical information recording medium.

In accordance with the present invention, an optical recording medium is disclosed which allows information to be recorded thereinto and read thereoutof by means of semiconductor laser light. The recording medium comprises at least a substrate and a recording layer formed on one or both sides of the substrate. Information is recorded into or reproduced from the recording layer by laser light. The recording layer comprises an organic film of a naphthoquinonoid dye corresponding to the following molecular formula or an organic film whose major component is the naphthoquinonoid dye:

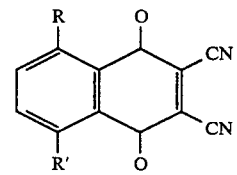

where R is a first auxochrome and R' a second auxochrome. The first auxochrome is a hydroxyl group, an amino group, or an alkyl substituted amino group, while the second auxochrome is a hydroxyl group, an amino group, an alkyl substituted amino group or

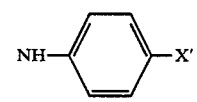

where X' is a hydrogen atom, an alkyl group, an amino group, a substituted amino group or an alkoxyl group.

The above and other objects, features and advantages of the present invention will become apparent from the following detailed description taken with the accompanying drawings.

DESCRIPTION OF THE PREFERRED EMBODIMENTS

While the optical information recording medium for semiconductor lasers of the present invention is susceptible of numerous physical embodiments, depending upon the environment and requirements of use, substantial numbers of the herein shown and described embodiments have been made, tested and used, and all have performed in an eminently satisfactory manner.

Referring to the accompanying drawings, the present invention will be described in detail in conjunction with some Examples.

EXAMPLE 1

Figure 1:
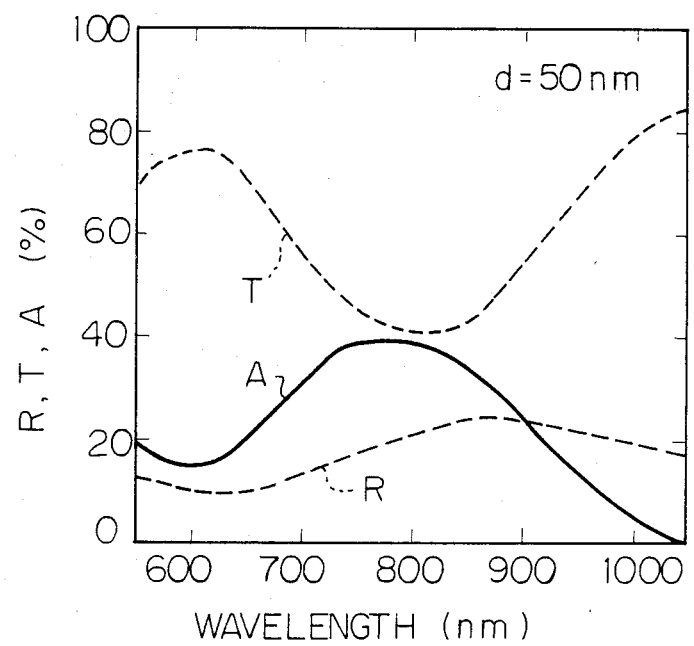
FIG. 1 is a plot showing absorption, reflectivity and transmissivity with respect to wavelengths in accordance with a first embodiment of the present invention.
Figure 2:
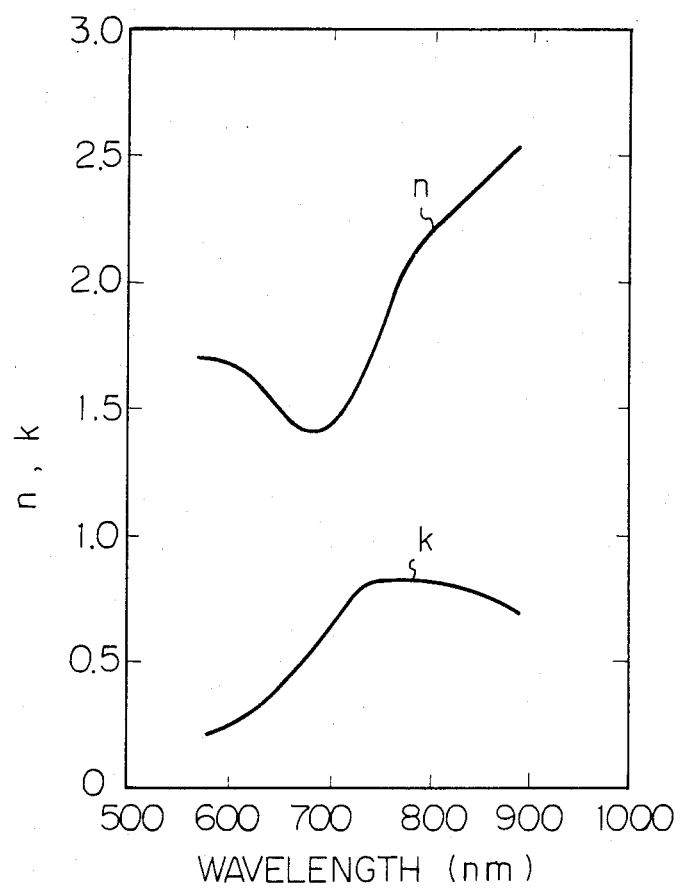
FIG. 2 is a plot representing a relationship between wavelengths and optical constants (n and k) attainable with the first embodiment of the present invention.
Figure 3:
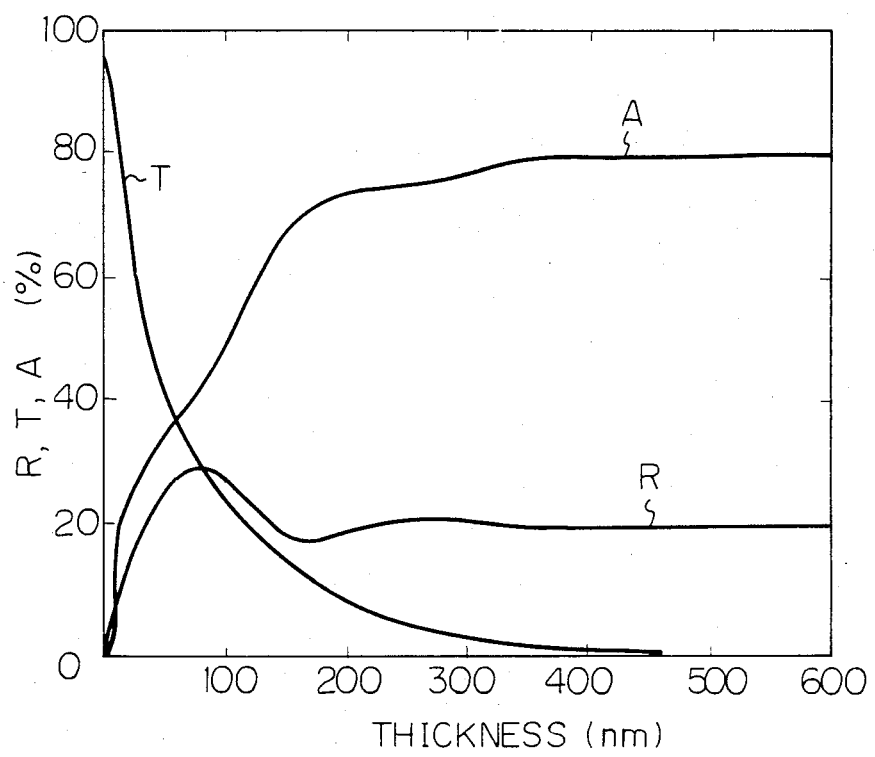
FIG. 3 is a plot showing a relationship between absorption, reflectivity and transmissivity and thicknesses of a film on a substrate provided by the first embodiment of the present invention by irradiating the film from the film surface side.
Figure 4:
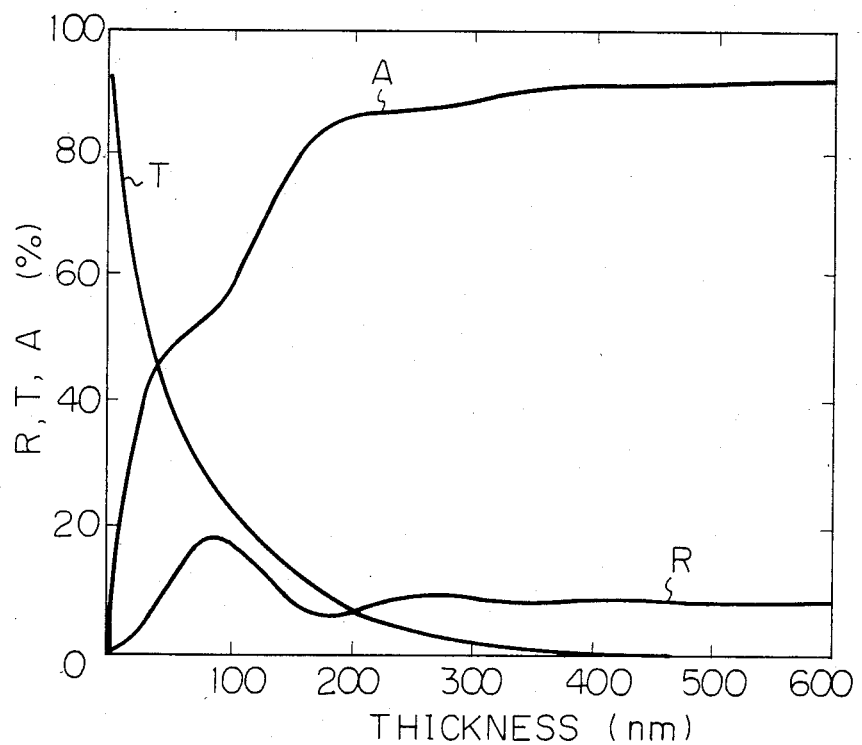
FIG. 4 is a plot similar to FIG. 3 but showing a relationship which resulted from irradiating the film through the substrate.

A powder of 5-amino-2,3-dicyano-8-(4-ethoxy anilino)-1,4-naphthoquinone was poured into a resistive heating boat made of molybdenum and then deposited by thermal evaporation on a 1.2 mm thick acrylic disc in a vacuum of $1\times10^{-5}$ Torr and at a boat temperature of 240° C. The deposition rate was about 10 nm/min. Forty-two such discs were prepared to have different film thicknesses which ranged from 20 nm to 600 nm. FIG. 1 shows absorption (A), reflection (R) and transmission (T) spectra for a 50 nm thick film in a 550–1050 nm wavelength range. It will be seen from FIG. 1 that such a film exibits the absorption maxima in the semiconductor laser wavelength range ($\sim$800 nm) and, therefore, is a hopeful optical disc medium for use with semiconductor lasers. The optical constants n (index of refraction) and k (extinction coefficient) of the dye films is obtained as shown in FIG. 2 from the dependence of A, R and T on the film thickness at each wavelength. As shown, n is 2.3 and k is 0.8 each at the wavelength of 830 nm and these values are quite large as those of an organic dye. FIG. 3 is a plot representing the dependence of A, R and T on film thickness observed by exposing the films to laser light from the film surface side and FIG. 4, one observed by exposing the same films via a substrate. Film thickness dependences of A, R and T shown in FIGS. 3 and 4 appear generally the same. However, the exposure from the film surface side leads to a larger R but a smaller A than the exposure through the substrate and this predicts that the former, although superior to the latter concerning readout signal level, is inferior in the aspect of recording sensitivity due to the small absorption relative to the latter.

Figure 5:
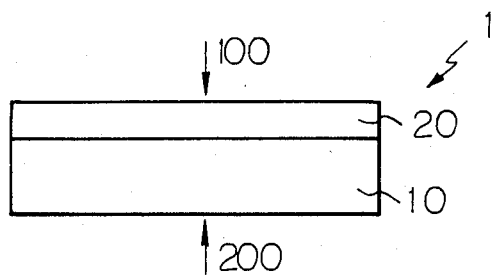
FIGS. 5–10 are cross sectional views individually showing structures of various kinds of media.

Referring to FIG. 5, one medium 1 in the form of a disc produced by the procedure described above is shown in a cross-sectional view. The medium 1 comprises a 1.2 mm thick polymethyl methacrylate (PMMA) substrate 10 and a 55 nm thick dye film 20 deposited on the substrate 10 and having the previously mentioned properties. The medium 1 was irradiated by a semiconductor laser beam having a wavelength of 830 nm in a direction indicated by an arrow 100. The laser beam was focused onto the film surface using a objective lens. The medium 1 was rotated by a rotation system such that the linear velocity of the disc was 13 m/sec at a record position. The recording and reading characteristics of such a disc were evaluated under various conditions of laser power and write pulse duration. For example, the record threshold power was measured to be 1 mW on the disc surface when the recording frequency was 2.5 MHz and the duty, 50%. When the exposure was made in a direction indicated by an arrow 200 opposite to the direction 100 while maintaining the other conditions the same, a 1.5 mW of recording threshold power was observed. About 1 μm wide holes or pits were formed by a 6 mW of power in both the directions 100 and 200. A 0.8 mW reading radiation allowed signals to be desirably reproduced regardless of the direction, 100 or 200.

EXAMPLE 2

The procedure disclosed in Example 1 was repeated except for the use of 5-amino-2,3-dicyano-8-(4-methoxy anilino)-1,4-naphthoquinone as a film forming material. The optical constants of the resulting films were, as in the aforementioned dye, measured to be 2.3–i0.8. Again, a 93.5 nm thick medium was formed on an acrylic substrate. The recording and reading characteristics of this medium were found as desirable as those of the medium prepared in Example 1.

EXAMPLE 3

As in Example 1, a number of films of 5-amino-2,3-dicyano-8-(4-methyl anilino)-1,4-naphthoquinone were prepared. At the wavelength of 830 nm, the films showed optical constants of 2.4–i0.7. A medium having a 80 nm thick film on an acrylic substrate was formed and its recording and reading characteristics were evaluated and found as good as in Example 1.

EXAMPLE 4

The procedure shown in Example 1 was repeated to prepare a film of 5-amino-2,3-dicyano-8-(4-n-butyl anilino)-1,4-naphthoquinone. The film had optical constants of 2.1–i0.5 at the wavelength of 830 nm. A medium was formed by deposition of a 55 nm thick film on a PMMA substrate. Evaluation proved that the recording and reading characteristics of the medium are comparable to those achieved in Example 1.

EXAMPLE 5

As in Example 1, a film of 5-amino-2,3-dicyano-8-(4-t-butyl anilino)-1,4-naphthoquinone was formed. The optical constants of this film were 2.1–i0.6 at the wavelength of 830 nm. A 76 nm thick medium was deposited on an acrylic substrate and recording and reading characteristics thereof were evaluated to attain a result as favorable as in Example 1.

EXAMPLE 6

The aforementioned naphthoquinonoid dyes were subjected to co-evaporation with a metal having a low melting point, thereby preparing a metal-containing dye medium. Description will proceed taking for example 5-amino-2,3-dicyano-8-(4-ethoxy anilino)-1,4-naphthoquinone as the dye and Sn as the low melting point metal. For evaporation, use was made of an apparatus having two resistive heating boats. Sn was put into one of the boats and the dye powder into the other, whereupon the two boats were individually heated to deposit them together on a substrate. The substrate comprised an acrylic plate having a diameter of 300 mm and a thickness of 1.2 mm and was placed 50 cm above the boats and rotated at 20 rpm. The resulted mixture film was measured to have a Sn concentration of 47% by volume and a thickness of 68 nm. Concerning the optical characteristics of the mixture film, the reflectivity was 23% and the absorption was 46% each measured through the substrate at the wavelength of 830 nm.

When information was recorded into the medium by means of a semiconductor laser as in Example 1, the power necessary for forming pits was determined to be 4 mW for an irradiating pulse width of 300 nsec.

Usable low melting point metals other than Sn include Ge, As, Se, Cd, In, Sb, Te, Pb, Bi and Ag and their alloys. The metal content of the mixture films is preferably selected within the range of 10–90% by volume and the thickness of the mixture films, within the range of 10–200 nm, desirably 20–100 nm.

EXAMPLE 7

A medium was prepared by dispersing 5-amino-2,3-dicyano-8-(4-diethylamino anilino)-1,4-naphthoquinone in polystyrene whose average molecular weight was 5,000. 1 g of the dye and 3 g of the polystyrene were dissolved in 50 ml of xylene and, then, a part of the solution was dripped on a rotating glass substrate to form a 0.6 μm thick dye-in-polymer film. While major part of xylene serving as the solvent volatilizes during spin coating to leave a solid film, it will be more effective to employ vacuum exhaustion to remove the solvent more sufficiently.

As in Example 1, information was recorded into and read out of the medium to achieve a favorable result.

Thermoplastic resins are desirable as the resin for dispersing dye therein and may be typified by, in addition to polystyrene mentioned, polyolefin, polycarbonate, polyacrylate, polymethacrylate, polyester, polyamide, polyvinyl acetate and their copolymers. An adequate molecular weight has to be selected for such a resin in view of the facts that excessively small molecular weights would increase the fluidity at room temperature thereby making it difficult to handle the formed medium and bringing about the gradual deformation of the pits in response to the read beam, and that excessively large molecular weights would cause a nonuniform pit shape thereby degrading quality of the signal playbacked from the medium. Usually, a preferable range of the molecular weight is 500-10,000. The spin coating employed for the above procedure may be replaced by spraying or dipping, if desired.

EXAMPLE 8

5-amino-2,3-dicyano-8-(4-ethoxy anilino)-1,4-naphthoquinone and nitrocellulose were dissolved in methylisobutyl ketone and the solution was spin-coated on a glass substrate. The dye-dispersed nitrocellulose film had a thickness of 200 nm and a dye concentration of 25% by weight. When the medium was exposed to laser light as in Example 1, 1 μm wide pits were formed therein by a power of 6 mW and irradiation time of 200 nsec. When such pits were read by a 0.5 mW laser beam, desirable signals were reproduced.

Figure 6:
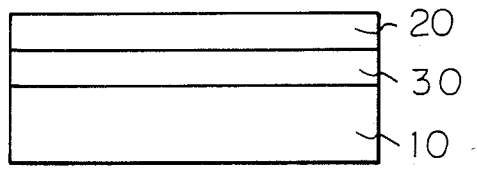
Figure 7:
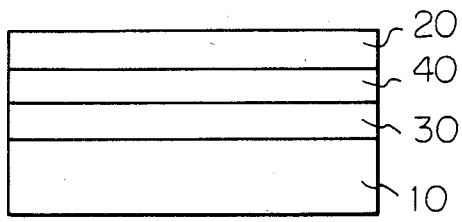
Figure 8:
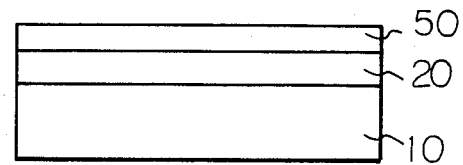
Figure 9:
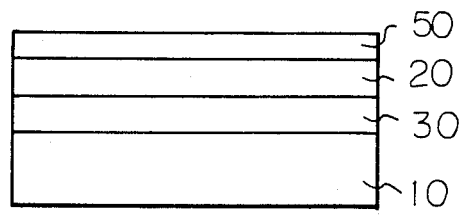
Figure 10:
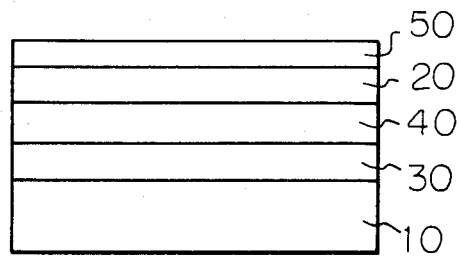

Another embodiment of the present invention is achievable by disposing an additional layer on a substrate together with the above-mentioned simple layer of naphthoquinonoid dyes, the layer of a mixture of naphthoquinonoid dye and a low melting point metal, or the layer formed by the dispersion of naphthoquinonoid dye in nitrocellulose. One such medium structure is attainable by, as shown in FIG. 6, inserting between the recording layer 20 and the substrate 10 a reflective layer 30 which shows a high reflectivity to the wavelengths of recording and reading lasers. Another possible structure, as shown in FIG. 7, may comprise a reflective layer 30 disposed on the substrate 10 and showing a high reflectivity to recording and reading laser wavelengths, a spacer layer 40 substatially transparent for the laser wavelengths, and the recording layer 20. From the recording and reading standpoint, it is preferred to select the thickness of the recording layer 20 in FIG. 6 and those of the recording layer 20 and spacer layer 40 in FIG. 7 such that the reflectivity of the medium becomes smaller. These thicknesses may be predetermined based on the theory of interference which is well known to those skilled in this art. The reflective layer 30 included in each of the structures discussed may be a film of metal selected from Al, Ag, Au, Cu, Cr, Rh, Ti and Ta or a reflection interference filter of dielectric layers. Concerning the spacer layer 40, use may be made of $SiO_2$, $Si_3N_4$, a metal oxide or a metal nitride. Further, FIG. 8 shows a two-layer structure, FIG. 9 a three-layer structure and FIG. 10 a four-layer structure which were individually formed by depositing on top of the media of FIGS. 5, 6 and 7 an absorptive layer 50 which is highly reflective and absorptive for recording and reading laser wavelengths. The absorptive layer 50 of the structure shown in FIG. 8 may be made of a material selected from simple metals such as Ge, As, Se, Cd, In, Sn, Sb, Te, Tl, Pb and Bi which are low melting point metals, and their alloys, oxides, nitrides, carbides, sulfides and halides. As to the absorptive layers 50 in FIGS. 9 and 10, on the other hand, they may preferably be selected from Ti, Cr, Al, Fe, Ni, Co, Ta, Rh, Au, Ag, Pt, W and Nb and their layered films, alloys, carbides, nitrides, etc., in addition to the substances usable for the layer of FIG. 8.

The substrate applicable to the present invention may be made of glass, a synthetic resin, an alminum alloy or the like. The synthetic resin may be selected from polymethyl methacrylate, polyvinyl chloride, polysulfone, polycarbonate, epoxy resin, etc. The substrate may be configured as a disc, tape or sheet, for example. A disc-shaped substrate is preferably provided with pregrooves for tracking and information pits for identifying tracks and sectors. Assuming the use of laser light with a wavelength of about 800 nm, each of the pregrooves and pits is dimensioned about 0.8 μm wide and about 0.08 μm deep.

A protective layer of dielectric, organic matter, refractory metal or the like may be furnished with on top of any structures obtainable with the present invention, employing any known method.

Various modifications will become possible for those skilled in the art after receiving the teachings of the present disclosure without departing from the scope thereof.

What is claimed is:

1. In an optical information recording medium having a substrate and a recording layer formed on at least one side of the substrate to permit information to be recorded thereinto or reproduced thereoutof by laser light, said recording layer comprising at least one of an organic film constituted by a naphthoquinonoid dye corresponding to the following molecular formula and an organic film whose major component is the naphthoquinonoid dye:

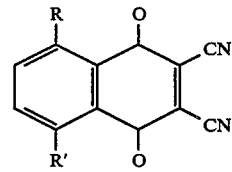

where R is a first auxochrome and R' a second auxochrome.

2. The recording medium as claimed in claim 1, in which the substrate is selected from the group consisting of glass, synthetic resins and alminum alloys.

3. The recording medium as claimed in claim 1, in which the top of the medium is covered with a protective layer.

4. The recording medium as claimed in claim 1, in which the organic film comprises a mixture of the naphthoquinonoid dye and a metal.

5. The recording medium as claimed in claim 1, in which the organic film comprises a mixture of the naphthoquinonoid dye and a thermoplastic resin.

6. The recording medium as claimed in claim 1, in which the organic film comprises a mixture of the naphthoquinone dye and nitrocellulose.

7. The recording medium as claimed in claim 1, in which a film of a metal having a low melting point is formed on the recording layer.

8. The recording medium as claimed in claim 1, in which a reflective layer for reflecting the laser light is formed between the substrate and the recording layer.

9. The recording medium as claimed in claim 8, in which a layer showing a high reflectivity and a high absorption to the laser light is disposed on the recording layer.

10. The recording medium as claimed in claim 8, in which a layer substantially transparent for the laser light is provided between the recording layer and the reflective layer.

11. The recording medium as claimed in claim 10, in which a layer showing a high reflectivity and a high absorption to the laser light is disposed on the recording layer.

12. The recording medium as claimed in claim 1, in which the first auxochrome is selected from the group consisting of a hydroxyl group, an amino group, and an alkyl substituted amino group.

13. The recording medium as claimed in claim 12, in which the second auxochrome is selected from the group consisting of a hydroxyl group, an amino group, an alkyl substituted amino group and

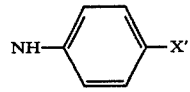

where X' is selected from the group consisting of a hydrogen atom, an alkyl group, an amino group, a substituted amino group and an alkoxyl group.

* * * * *